United States Patent [19]
Ostendorp

[11] Patent Number: 5,898,558
[45] Date of Patent: Apr. 27, 1999

[54] PROTECTIVE OVERLOAD DEVICE

[75] Inventor: Markus Ostendorp, North Richland Hills, Tex.

[73] Assignee: Electric Power Research Institute, Inc., Palo Alto, Calif.

[21] Appl. No.: 09/026,799

[22] Filed: Feb. 20, 1998

[51] Int. Cl.[6] .................................................. H02H 7/00
[52] U.S. Cl. ...................... 361/107; 361/1; 174/45 TD; 174/40 TD; 248/64
[58] Field of Search .................................. 361/1, 62, 67, 361/79, 107; 174/40 R, 45 R, 45 TD, 40 TD; 248/61, 63, 64

[56] References Cited

U.S. PATENT DOCUMENTS

| | | | |
|---|---|---|---|
| 3,711,049 | 1/1973 | Grannis ........................................ | 248/64 |
| 4,195,192 | 3/1980 | Hackney et al. ..................... | 1740/40 R |

OTHER PUBLICATIONS

United States Department of Energy Final Report entitled "Test Verification of a Device for Reduction of Severe Dynamic Loads in Electric Transmission Towers", prepared by Anco Engineers, Inc. (1989).

Electric Power Research Institute Research Report EL–643, entitled Longitudinal Unbalaced Loads on Transmission Line Structures (1978).

Primary Examiner—Jeffrey Gaffin
Assistant Examiner—Michael J. Sherry
Attorney, Agent, or Firm—Flehr Hohbach Test Albritton & Herbert LLP; William S. Galliani

[57] ABSTRACT

A protective overload device (POD) that absorbs energy and reduces the damage to transmission towers resulting from sudden conductor, shield wire, insulator, or conductor suspension failures is herein disclosed. The POD is positioned between the non-energized end of the insulator and the tower or support structure, or between the energized end of the insulator and the conductor. The POD consists of a top lid, a bottom plate, and a ductile load fuse refill disk. The top lid is slotted at regular intervals to allow for transverse deformation of the individual fingers that hold the bottom plate. The ductile load fuse refill disk consists of a filler material in which a steel cable is embedded. The POD acts as a passive rigid link under normal conditions. In the event of a dynamic shock that could fail a tower or tower arm, the fingers of the top lid will move outward along the sliding plane of the bottom plate until the bottom plate separates from the top lid. At this time all the load is transferred to the refill disk which will disintegrate as the steel cable is pulled through the refill disk's material. Once the device has been activated, the POD can be reset by fitting the device with a new refill disk and reassembling the device by pressing the top lid and bottom plate together.

14 Claims, 8 Drawing Sheets

PROTECTIVE OVERLOAD DEVICE

BRIEF DESCRIPTION OF THE INVENTION

The present invention relates generally to electric power lines. More particularly, the invention relates to mechanical load limiting devices for power lines.

BACKGROUND OF THE INVENTION

The utility industry is finding it more difficult to meet the increased demand for electric power and at the same time to obtain right-of-ways on which to build new transmission lines. Hence electric utility companies are compelled to seek methods of transmitting more energy over existing rights-of-way. One means of accomplishing this objective is by replacing existing conductors with larger conductors, but this imposes larger mechanical loads upon the towers than their original design accommodates. If, as a result, the tower should fail, the failure would damage or destroy a number of towers which, in turn, would cause long delays in getting the line back in service. In order to avoid replacing towers to handle the larger loads imposed, various load limiters have been used to limit the horizontal component of force to which the tower is subjected and which allow the line to drop to the ground when the pre-selected force is exceeded, thereby avoiding damage to the tower.

Therefore, various types of mechanical load limiters have been used. However, some of the prior art load limiters have not functioned satisfactorily in that they sometimes release before the safe load is exceeded and sometimes do not release until damage to the tower has occurred. In previous load limiting devices, once the load limiter is released, the entire device needs to be replaced. Often, the replacement of the load limiter is a costly and time consuming ordeal. Accordingly, the need exists for a load limiting mechanism that overcomes these shortcomings.

SUMMARY OF THE INVENTION

The present invention is a protective overload device (POD) that reduces the damage to transmission towers resulting from sudden conductor, shield wire, insulator, and conductor suspension failures. The POD is positioned between the non-energized end of an insulator and the tower or support structure, or between the energized end of the insulator and the conductor. The POD consists of a top lid, a bottom plate, and a refill disk. The top lid is slotted at regular intervals to allow for transverse deformation of the individual fingers that hold the bottom plate. The refill disk consists of a filler material in which a steel cable is embedded.

The POD acts as a passive rigid link under normal conditions. In the event of a dynamic shock that could fail a tower or tower arm, the fingers of the top lid will move outward along the sliding plane of the bottom plate until the bottom plate separates from the top lid. At this time all the load is transferred to the refill disk which will disintegrate as the steel cable is pulled through the refill disk's material. In this manner, the POD absorbs the shock energy and reduces the forces applied to the adjacent towers. In this manner, tower damage is prevented or limited to the tower directly affected and thus mitigating against multiple tower or cascade failures. Once the device has been released, the POD can be reset by fitting the device with a new refill disk and reassembling the device by pressing the top lid and bottom plate together.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
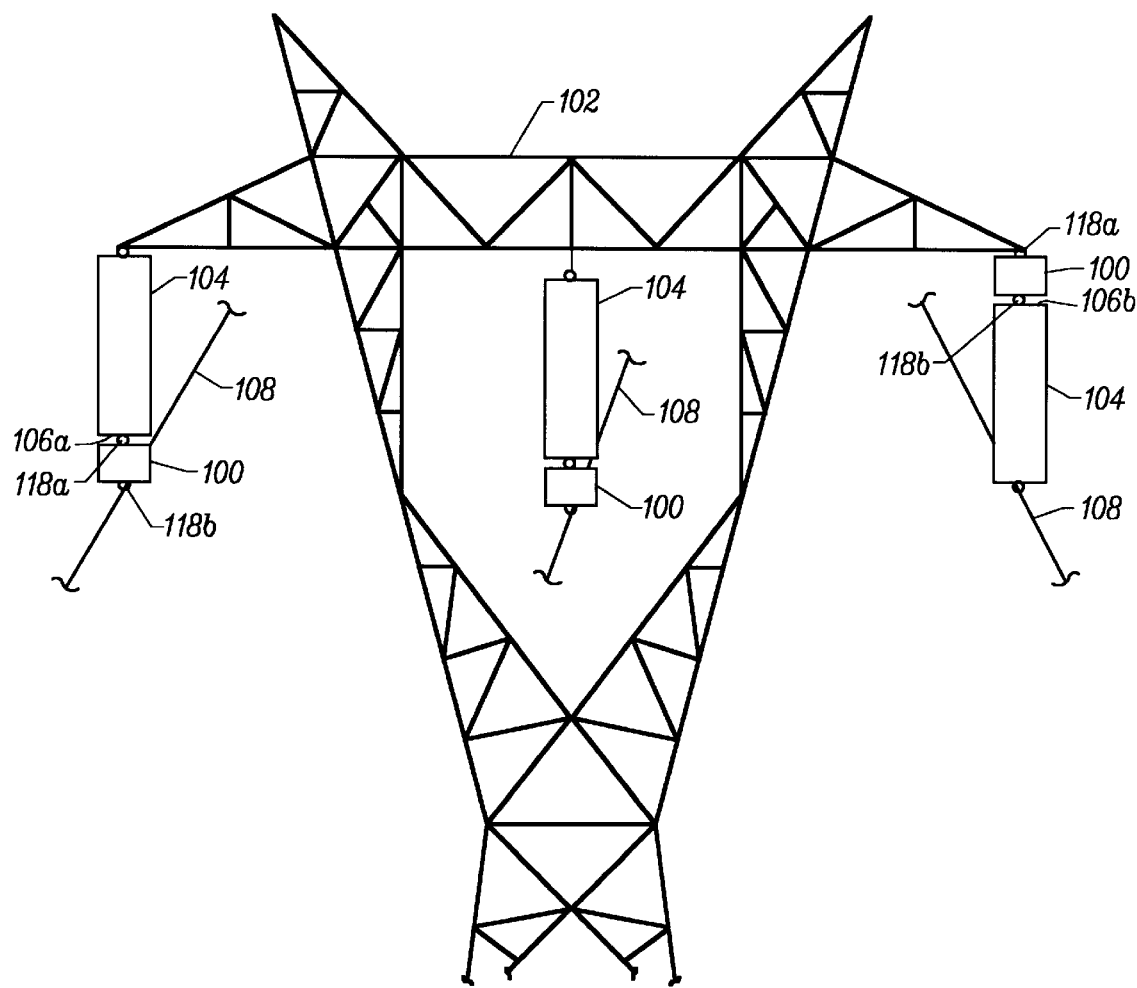
FIG. 1 illustrates the placement of the protective overload device (POD) in accordance with an embodiment of the invention.
Figure 2A:
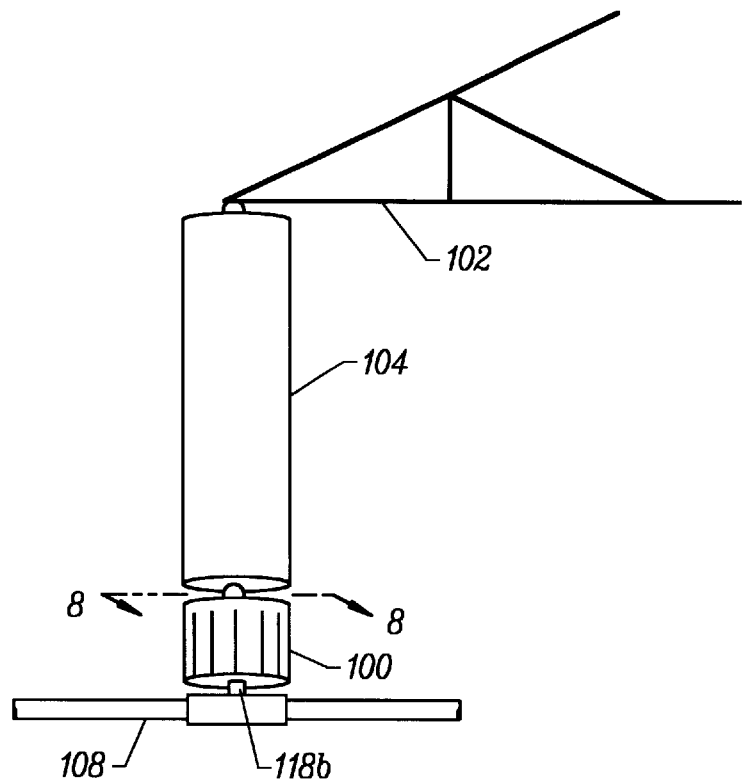
FIG. 2A illustrates the placement of the POD in one embodiment of the invention.
Figure 2B:
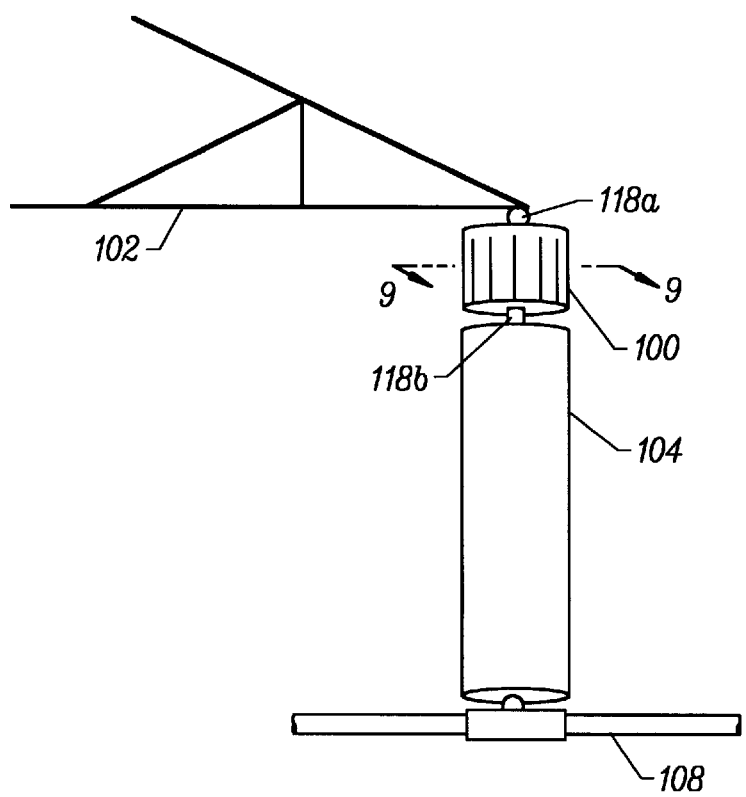
FIG. 2B illustrates the placement of the POD in another embodiment of the invention.

The load limiting or protective overload device (POD) of the present invention is used to control or limit the force imposed on an electric transmission line tower in the event of a conductor, shield wire, insulator, or conductor suspension failure. FIGS. 1 and 2 illustrate the placement of the POD 100 in a transmission tower 102. Referring to FIGS. 1 and 2A, the POD 100 can be placed between the non-energized side 106a of the insulator string 104 and the conductor 108. The insulator string 104 is attached to the transmission tower 102. Alternatively, as shown in FIGS. 1 and 2B, the POD 100 can be placed between the transmission tower 102 and the energized-side 106b of an insulator string 104. The insulator string 104 is then connected to the conductor 108.

Various configurations of insulator strings and conductor lines are possible. For this reason the present invention is not limited to the above placements and the POD 100 can be placed in alternate positions in these configurations. In addition, the POD 100 can be utilized in any type of transmission line support structure and is not limited to a transmission lattice tower. Further the POD can be attached to ground or shield wires.

Figure 3:
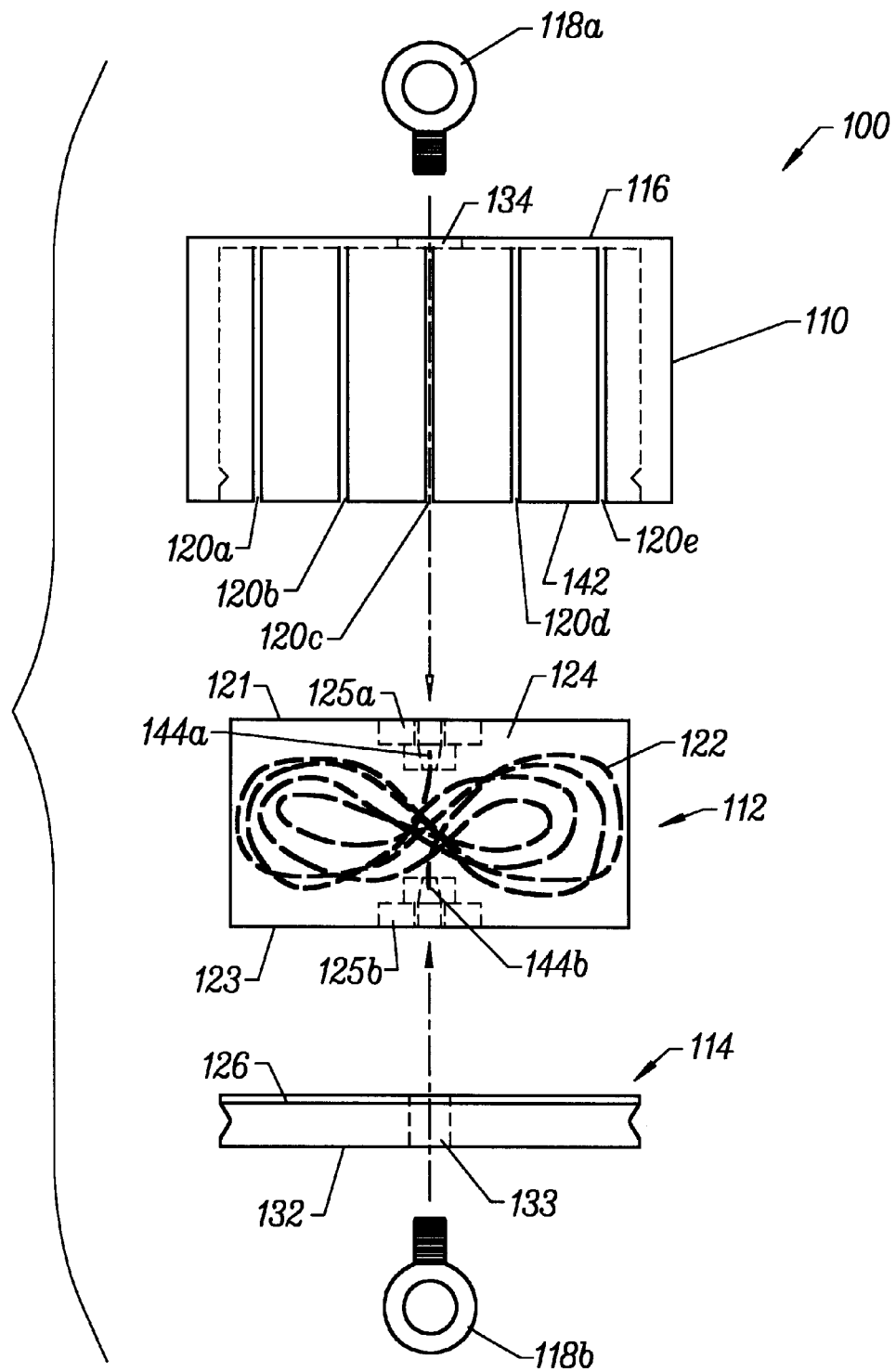
FIG. 3 is an exploded view of the POD in accordance with an embodiment of the invention.

FIG. 3 illustrates the main components of the POD 100. The POD 100 is a reusable ductile load fuse that consists of three main components: a top lid 110; a refill disk 112; and a bottom plate 114.

Figure 4:
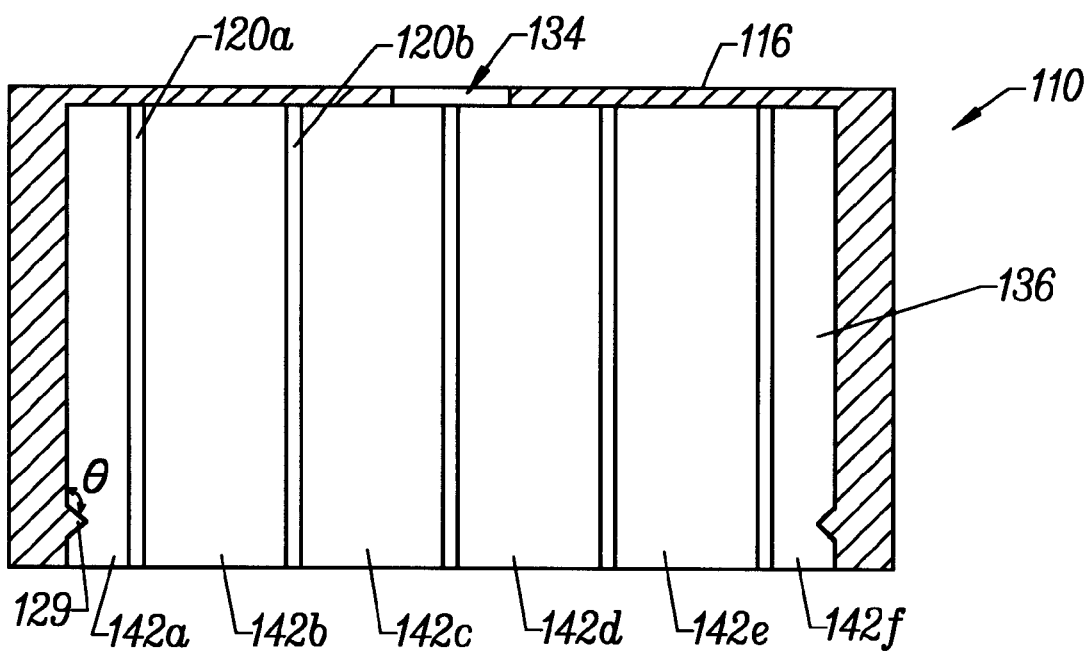
FIG. 4 is a cross sectional view of the top lid shown in FIG. 3.

The top lid 110 may have a round cylindrical shape with a top surface 116 and a hollow cavity 136 (see FIG. 4). The top surface 116 has a circular aperture 134 through which an eye bolt 118a is slid and threaded to a top fastener 125a located on the top surface 121 of the refill disk 112. The eye bolt 118a is used to suspend the POD 100 to a top suspension point which can be either the transmission tower 102 or to an end of the insulator 104.

The height of the top lid can range from 2" to 18" and the outer diameter of the top lid can range from 2" to 12". The top lid is formed of either aluminum or high strength steel depending on the magnitude of the desired release load.

The top lid 110 contains a number of slots 120 forming circumferentially disposed depending fingers 142. The fingers 142 are used to hold the bottom plate 114 of the POD 100 in the top lid 110. The width of each finger 142 varies between ½" to 1½". The number of fingers 142 varies and is based on the diameter of the top lid 110 and the width of the fingers 142.

FIG. 4 is a cross sectional view of the top lid 110. The top lid 110 form defines an interior hollow cavity 136 having a height ranging from 1½" to 17" and an inside diameter ranging from 1½" to 11½". The hollow cavity 136 is used to house the refill disk 112. At the bottom of the top lid 110 is an annular ring 129 formed integral on the lower end of the fingers 142. The annular ring 129 is used to fasten the bottom plate 114 to the top lid 110. Preferably, the annular ring 129 protrudes from the plane of the inner wall at a 45 degree angle, as approximately shown in FIG. 4 with angle θ.

Referring back to FIG. 3, the refill disk 112 can be of a round cylindrical shape and made of a filler material 124 as discussed below. The refill disk 112 includes a high strength steel cable 122 embedded in the filler material 124. Preferably, the width of the steel cable 122 ranges from ⅛" to ⅜" and the length of the steel cable 122 ranges from 3 ft. to 12 ft. The length of the cable is determined based on the minimum electrical clearances that need to be maintained by the conductor or shield wire. These equivalents are listed in the National Electric Safety Code (NESC). The diameter of the cable is governed by the magnitude of the loads that are expected.

The filler material 124 can be either high strength grout, epoxy, plastic, or any other type of filler material that has similar physical properties. The selection of the filler material is based on the rate of release that is to be achieved for the steel cable. The load capacity and release rate of the filler material is determined based on the load capacity of the support structure.

Embedded in the top side 121 of the refill disk 112 is a fastener 125a that connects the top eye bolt 118a with the top end 144a of the steel cable 122. Similarly, embedded in the bottom side 123 of the refill disk 112 is another fastener 125b that connects the bottom eye bolt 118b with the bottom end 144b of the steel cable 122.

Figure 5:
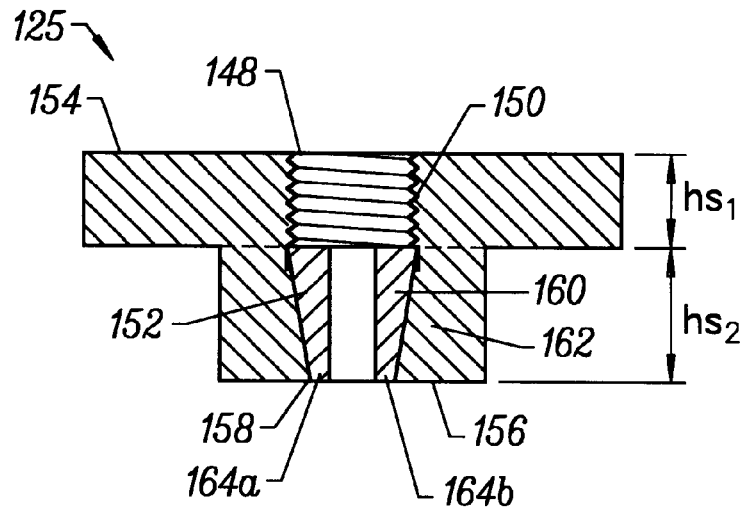
FIG. 5 is a cross sectional view of the fastener shown in FIG. 3.
Figure 6:
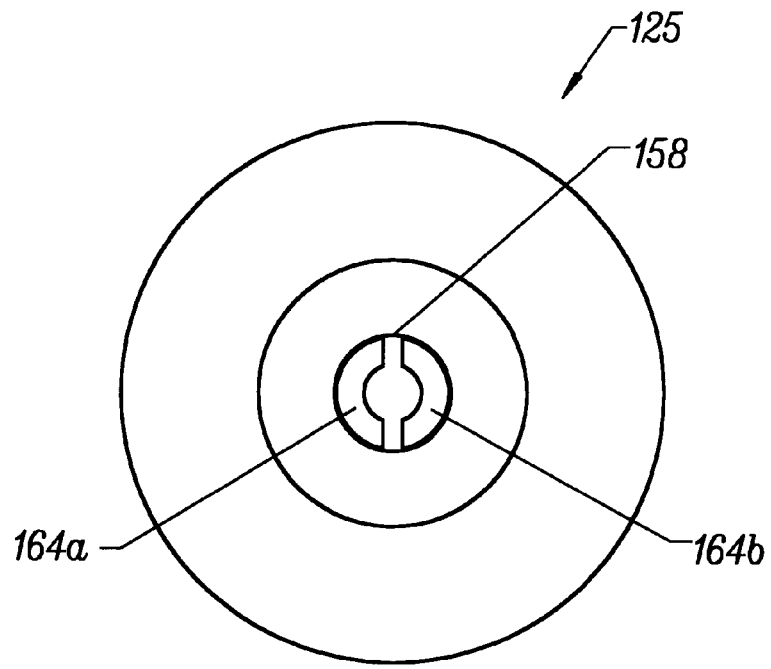
FIG. 6 is a bottom view of the fastener shown in FIG. 5.

FIG. 5 is a cross sectional view of the fastener 125. FIG. 6 is a bottom view of the fastener 125. In one embodiment of the invention, the fastener 125 contains a circular hollow cavity 152 having a diameter $d_H$ of about ¾ of an inch. The hollow cavity 152 has a first circular bore 148 located at the top surface 154 of the fastener 125 and a second conical bore 158 located at the bottom surface 156 of the fastener 125. The top segment 150 of the circular hollow cavity 152 is threaded with 10 threads per inch. An eye bolt is threaded into the fastener 125 through the threaded segment 150 of the cavity 152. The height of the top segment $h_{S1}$ ranges from ½" to 1½".

The lower segment 162 of the circular hollow cavity 152 contains a conical compression wedge 160. The height of the bottom segment $h_{S2}$ ranges from ½" to 2½. The compression wedge is made of steel. The inner diameter of the compression wedge can vary from 3/16" to ¾" depending on the size of the cable. The outer diameter of the wedge varies from 5/16" to 1" on the smaller end, and ½ to 2" on the other end.

Figure 7A:
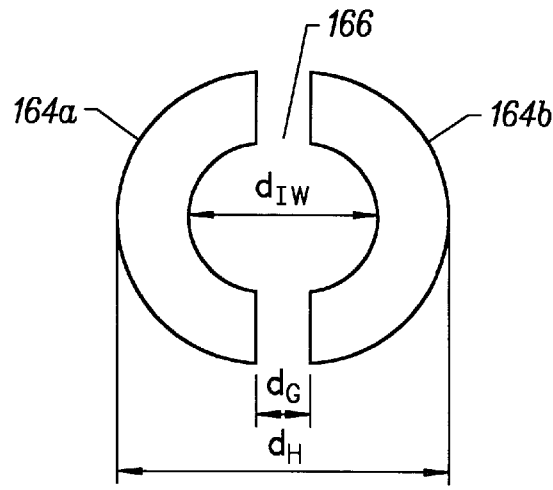
FIGS. 7A–7C are various bottom views of the compressed wedge shown in FIG. 5.
Figure 7B:
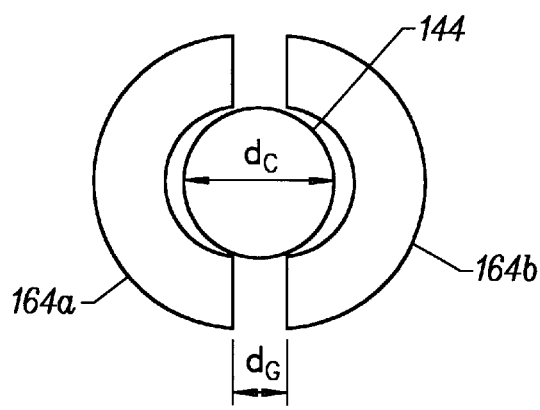
Figure 7C:
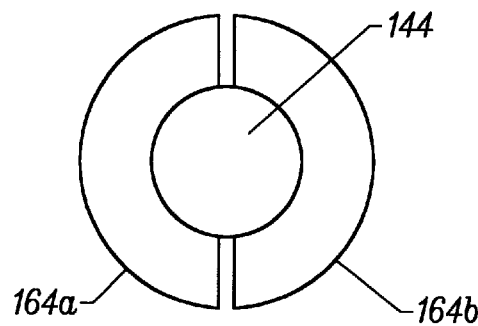
Figure 8:
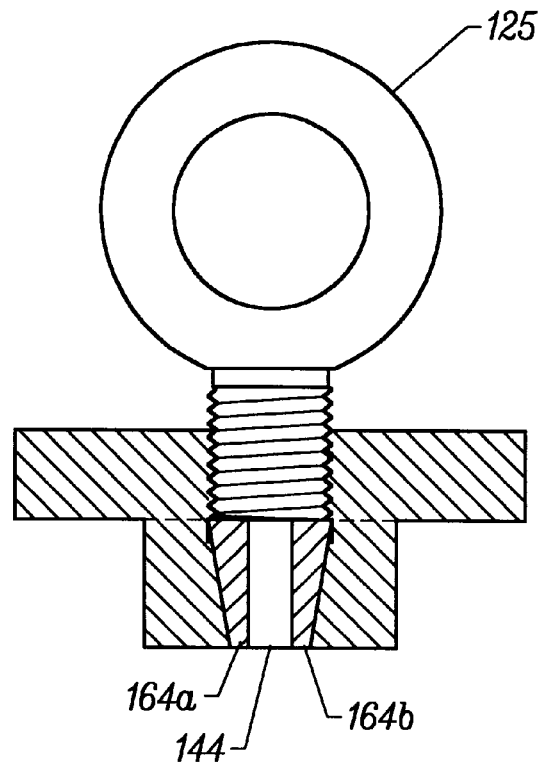
FIG. 8 is a cross sectional view of the eye bolt secured to the fastener taken across the 8—8 section shown in FIG. 2A.

FIGS. 7A–7C and FIG. 8 illustrate the compression wedge 160. The compression wedge 160 includes two crescent shaped wedges 164a, 164b forming an inner cavity 166 having a diameter $d_{IW}$ which is less than the diameter $d_H$ of the hollow cavity 152. There is a gap $d_G$ separating the two wedges 164a, 164b. An end of the cable 144 is inserted through the inner cavity 166. The diameter of the cable $d_C$ is less than the diameter $d_{IW}$ of the inner cavity 166. When pressure is applied to the compression wedge from the insertion of an eye bolt 118, the two wedges are compressed towards each other thereby narrowing the gap between them as shown in FIG. 7C. This pressure securely fastens the cable 144 into the compression wedge 160 and hence, the fastener 125, as shown in FIG. 8.

Referring back to FIG. 3, the bottom plate 114 is of a round cylindrical shape. The bottom surface 132 of the bottom plate 114 has a circular aperture 133 through which a bottom eye bolt 118b is slid and attached to a fastener 125b located on the bottom side 123 of the refill disk 112. The bottom eye bolt 118b is used to suspend the POD 100 to a second suspension position. The second suspension position can be the conductor 108 or an end of the insulator string 104.

The bottom plate 114 has a height ranging from ¼" to 1", and an outer diameter ranging from 2" to 12". The bottom plate 114 is a solid disk that can be made of either aluminum or steel depending on the magnitude of the release load. The bottom plate 114 is indented at an angle to reciprocally fit the annular ring 129 of the top lid 110.

In an embodiment of the invention, the outer diameter $d_B$ of the bottom plate 114 is the same as the inner diameter of the top lid. This allows for the bottom plate 114 to be securely fastened into the top lid 110 by fitting the plate 114 into the top lid's annular ring 129. This can be accomplished by means of a hydraulic press. The bottom plate 114 is securely fastened to the top lid 110 when the refill disk 112 is positioned into the hollow cavity 136 of the top lid 110.

Figure 9:
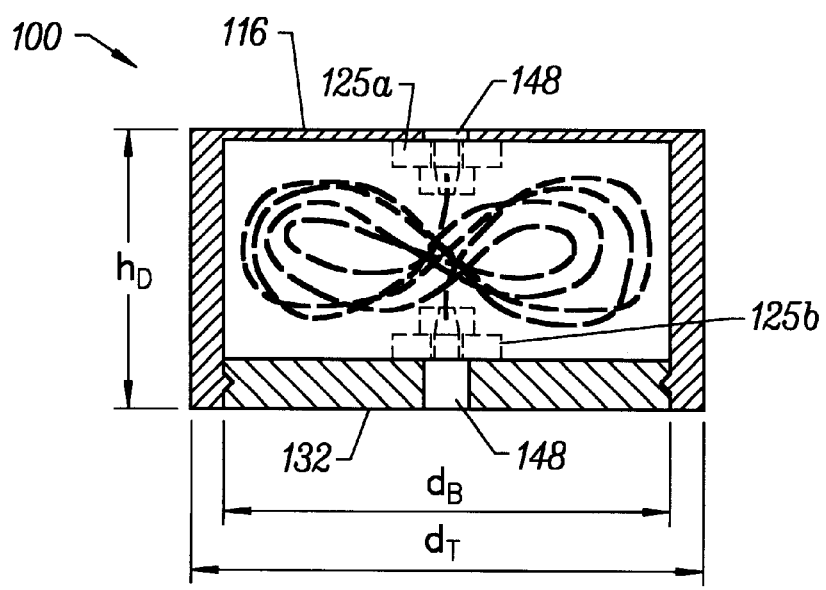
FIG. 9 is a cross sectional view of the assembled POD taken across the 9—9 section shown in FIG. 2B.

FIG. 9 is a cross sectional view of the assembled POD 100. The invention has been implemented with an outside diameter $d_T$ of the POD 100 ranging between 2 to 12 inches and the overall height $h_D$ of the POD 100, exclusive of the eye bolts 118, ranging between 2 to 18". The weight of the assembled POD 100 ranges between 5 and 50 lbs.

Figure 10:
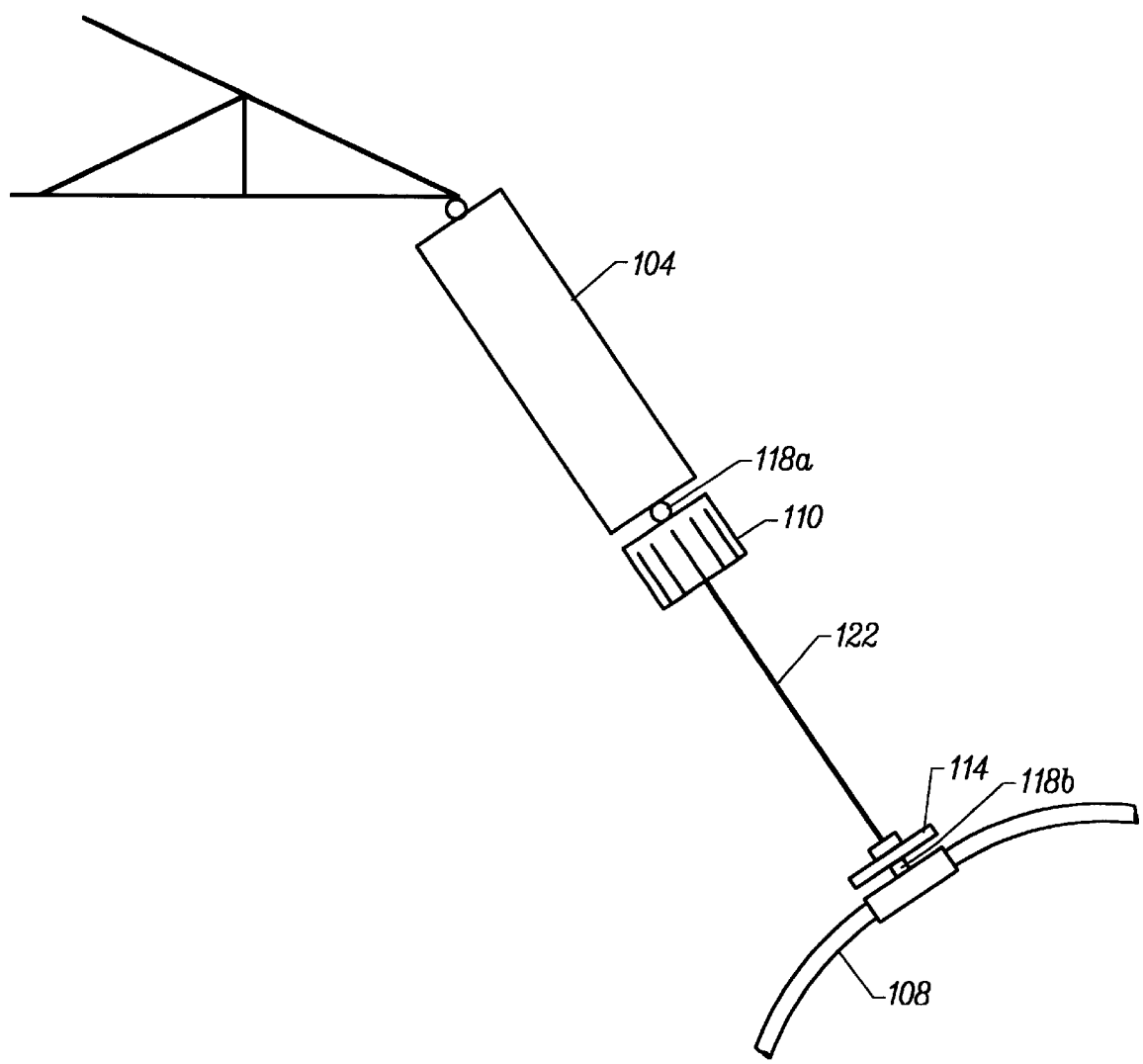
FIG. 10 is an illustration of the released POD.

FIG. 10 illustrates the POD 100 once it has been released. At the POD's 100 designed release load, the fingers 142 of the top lid 110 will move outward along the bottom plate 114 until the bottom plate 114 separates from the top lid 110. The release load of the POD is calibrated to the longitudinal load capacity of the transmission structure and can range from 50 lbs. to 50,000 lbs. The release load must be low enough to open the POD before the structure fails.

To explain the POD's release load further, assume that $R_L$ is the POD's release load, $U_T$ is the unbalanced tension exerted on the POD due to a broken conductor, shield wire, ground wire, or the like, and $S_R$ is the resistance of the transmission structure. When $U_T > S_R$, the structure will fail possibly resulting in further failures to other structures along the line. Consequently, $U_T > S_R > R_L$. For example, if $S_R = 5000$ lbs and $U_T = 7500$ lbs, then $R_L$ must be less than 5000 lbs. In a preferred embodiment, $R_L$ is calibrated to be 85% of $S_R$. For the above example, $R_L$ can be 4250 lbs.

Once the POD's release load has been reached, the bottom plate separates from the top lid. At this time all the load is transferred to the cable embedded in the refill disk which disintegrates as the cable is pulled out of the refill disk's material. The filler material affects the release rate of the cable. In this manner, the POD 100 absorbs the shock energy and reduces the forces applied to the failed tower or to adjacent towers. Tower damage is prevented or limited to the tower directly affected thus mitigating against multiple tower or cascade failures.

The POD 100 is a reusable device which can be reassembled after it has been separated. A new refill disk 112 can be obtained and the POD can be reassembled by utilizing a hydraulic press to fasten the existing top lid 110 and the bottom plate 114. The new refill disk 112 is inserted in the top lid 110 and the eye bolt 118a is screwed into the top fastener 125a. The top lid 110 is then pressed onto the bottom plate 114 until the annular ring 129 on the top lid 110 slides into the groove on the bottom plate 114. Next, the bottom eye bolt 118b is screwed through the bottom plate 114 into the fastener 125b at the bottom of the refill disk 112. Any parts or assemblies not damaged in the release can be reused.

The reusability of the POD 100 is beneficial for several reasons. First, it makes the POD 100 more cost effective than alternative load limiters since it can be reused. Further, the ability to refit the refill disk 112 enables the use of a different filler materials 124 that can accommodate a different release load and/or rate when changes occur in the load capacity of the transmission structure.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

The POD's primary application is the transmission line industry for the purpose of limiting the magnitude of unbalanced forces acting on the transmission tower or support structures due to component failures. However, the POD can be used in the transmission industry during construction to limit stringing loads on shield wires, fiber optic overhead ground wires, all dielectric self supporting fiber optic cables, and transmission support structures. In addition, the POD can be used in other applications where the need exists to minimize a force acting on an object. An example of such an application is in the construction industry where lifting loads need to be restricted or where loads to equipment need to be limited.

I claim:

1. A load limiting apparatus, said apparatus comprising:
a first housing member having a first suspension member for suspending said apparatus from a first suspension point, said first housing member defining a hollow cavity;
a second housing member having a second suspension member for suspending said apparatus from a second suspension point, said second housing member including a link mechanism to attach said second housing member to said first housing member, said link mechanism releasing said second housing member from said first housing member when a load is applied to said apparatus that exceeds a predetermined load capacity; and
a refill disk including a conductor expansion mechanism embedded in a filler material, said refill disk positioned inside said hollow cavity, said conductor expansion mechanism having a first end and a second end, said first end attachable to said first suspension member and said second end attachable to said second suspension member, said filler material releasing said conductor expansion mechanism at a predetermined release rate when the load applied to said apparatus exceeds the predetermined load capacity.

2. The apparatus of claim 1,
wherein said first suspension point is a transmission tower; and
wherein said second suspension point is a first end of an insulator string.

3. The apparatus of claim 1,
wherein said first suspension point is a second end of an insulator string; and
wherein said second suspension point is a conductor.

4. The apparatus of claim 1,
wherein said filler material is selected from the group consisting of grout, epoxy and plastic.

5. The apparatus of claim 1,
wherein said conductor expansion mechanism is a steel cable.

6. The apparatus of claim 1,
wherein the predetermined release rate is based on the filler material.

7. The apparatus of claim 1,
a new refill disk including a conductor expansion mechanism embedded in a filler material, said new refill disk replacing said refill disk and positioned inside said hollow cavity, said new refill disk enclosed in the first and second housing members after the refill disk disintegrates.

8. A method for limiting a load activated on a transmission support structure, said method comprising the steps of:
a) providing a load limiting device having a first housing member, a second housing member, and a refill disk, said first housing member defining a hollow cavity, said refill disk including a conductor expansion mechanism embedded in a filler material, said refill disk positioned inside said hollow cavity, said second housing member enclosing said refill disk inside said first housing member, said conductor expansion mechanism having a first end and a second end, said first end attachable to said first housing member and said second end attachable to said second housing member;
b) placing said load limiting device in at least one position in said transmission support structure; and
c) upon activation of a load exceeding a load capacity, releasing said second housing member from said first housing member, and
releasing said conductor expansion mechanism from said filler material such that said load limiting device limits damage to the transmission support structure from activation of the load.

9. The method of claim 8,
wherein said first housing member further includes a first suspension member for positioning said device at a first point in said transmission support structure and said second housing member including a second suspension member for positioning said device at a second point in said transmission support structure.

10. The method of claim 9, said placing step further comprising the steps of:
   attaching said first suspension member to said transmission support structure; and
   attaching said second suspension member to a first end of an insulator string.

11. The method of claim 10, said placing step further comprising the steps of:
   attaching said first suspension member to second end of an insulator string; and
   attaching said second suspension member to a conductor.

12. The method of claim 8, further comprising the steps of:
   disassembling the conductor expansion mechanism from said first and second housing members;
   providing a new refill disk;
   positioning said new refill disk inside said hollow cavity;
   assembling said first and second housing members; and
   reassembling said first and second housing members.

13. The method of claim 8, wherein said filler material is selected from the group consisting of grout, epoxy, and plastic.

14. The method of claim 8, wherein said conductor expansion mechanism is a steel cable.

* * * * *